Dec. 3, 1963     T. D. SMITH ETAL     3,113,223
BENDER-TYPE ACCELEROMETER
Filed July 27, 1960

INVENTORS.
THOMAS D. SMITH
BY HARRY R. SPENCE
David P. Ogden
Christie, Parker & Hale
ATTORNEYS.

United States Patent Office 3,113,223
Patented Dec. 3, 1963

3,113,223
BENDER-TYPE ACCELEROMETER
Thomas D. Smith and Harry R. Spence, Los Angeles,
Calif., assignors to Space Technology Laboratories,
Inc., Los Angeles, Calif., a corporation of Delaware
Filed July 27, 1960, Ser. No. 45,681
2 Claims. (Cl. 310—8.5)

This invention relates to measuring devices and has particular reference to a lightweight miniature accelerometer or vibration transducer.

More so today than before, interest is focused on the mechanical dynamic characteristics of small objects as affecting their intended operation. For example, in the case of packaged electronic components as employed in missiles, the effect of the dynamics of various components on the electronic performance is of vital interest.

A direct approach to the problem is instrumentation with vibration transducers. This, however, is easier said than done when the objects whose dynamics are of interest are small or are crowded into tight assemblies, or both, because it must be possible to mount the transducers at proper locations and orientations on the objects of interest and connected structure which possibility will be dictated by limitations on the size and shape of the transducer, and because the mass of the transducer must in each instance be small compared to the mass of the object on which it is mounted so as to not materially alter the dynamics of the object.

Thus, commensurate with reasonable performance standards, the size, shape and weight of a vibration transducer is of controlling importance for many applications.

In accordance with the present invention, there is provided a vibration transducer which is extremely lightweight and small size. The transducer has a slender elongated shape and is characterized by its ease and versatility of mounting, its capability of application to small test objects under crowded conditions, and, in its preferred form, by such an unusually low cost that it may be considered a "throw-away" item. Significantly, these characteristics are obtained without sacrificing good performance.

The transducer of the invention includes a slender elongated support having therein a narrow longitudinal slot. A piezoelectric strain sensitive element in the form of an elongated beam is cantilevered within the slot. The beam is supported at one end, and means are contained within the slot for damping motion of the beam. Electrical terminals are coupled to opposite sides of the beam adjacent the supported end.

Also within the scope of the invention is a subcombination suitable for certain applications in which the damping means is omitted.

In one embodiment of the invention the slot extends completely through the support and terminates longitudinally a short distance from each end of the support, and the damping means comprises compressed opposing bodies of elastic material disposed in the slot on opposite sides of the beam at a location intermediate the ends of the beam. Also, one particular support has a flat longitudinal exterior surface parallel to the beam. This arrangement provides an exceptionally lightweight construction for a damped instrument and permits the device to be secured, as by the use of cement, directly to the object under test. The elastic damping bodies provide an additional support and a concentrated damping action. The additional support protects the elongated beam which has a thickness on the order of .020 inch in many arrangements and should be considered fragile.

The support may be of conventional linen base phenolic material, and the elastic damping bodies may be, by way of example, two small pieces of neoprene. A conventional phonograph crystal, such as that used in a Sonotone 2TS cartridge, is suitable for the vibration (strain) sensitive elongated beam. Employing these materials at the present time, the total manufacturing cost should be on the order of one dollar or less per unit, making the instrument expendable for most applications and thus eliminating the time and labor required for recovering the transducer.

Various features contributing to the foregoing advantages and to others are brought out in the following detailed description taken with reference to the drawings, in which.

Figure 1:
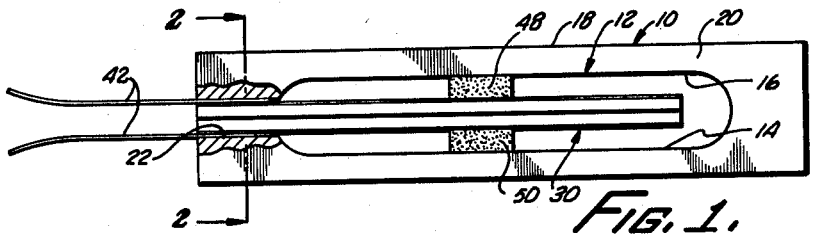
FIG. 1 is a side elevation partially cut away of a preferred embodiment of the transducer of the invention.

Referring now to FIGS. 1 to 4 in which like reference characters designate similar parts, the transducer is provided with a slender elongated support 10. The support may be made of a linen base phenolic to provide a lightweight, strong construction which is substantially rigid; for example, Panelyte grade 950, manufactured by St. Regis Paper Company, St. Regis, New York. The support 10 has a substantially uniform central slot 12 which extends longitudinally for a major portion of the length of the support, terminating at a distance from each end of the support to provide desired structural coherence. In the embodiment illustrated, the slot 12 extends transversely completely through the support and has substantially flat opposite side walls 14 and 16 defined by the support 10.

Exteriorly, the support 10 is shown as having a uniform rectangular cross-sectional outline defined by four adjoining substantially flat rectilinear exterior surfaces extending longitudinally of the support 10, including a first exterior surface 18 which is parallel to the side walls of the slot 12 and a second exterior surface 20 which is perpendicular to the first surface 18. Centered within the cross-sectional outline of the support 10 at one end is a relatively small rectangular opening 22 extending longitudinally through the end of the support 10 and communicating with the slot 12. The rectangular opening is illustrated as being of a uniform cross-section along its length and as lying generally parallel to the side walls 14 and 16 of the slot 12.

Figure 4:
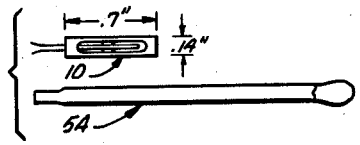
FIG. 4 is a side elevation of the transducer of FIG. 1 drawn alongside a conventional kitchen match to illustrate one size of the transducer.

As best seen in FIG. 4, the support preferably is constructed of two identical half sections 24 and 26 joined along a central longitudinal plane (indicated by the lines 28) which lies perpendicular to the side walls of the slot 12 and to the first exterior surface 18 of the support. The two half sections are joined by a rigid cement, such as a cement containing 60 parts by weight Shell Epon 828 available from the Shell Chemical Company, and 40 parts by weight Versamide 125 available from General Mills, Inc.

A piezoelectric strain sensitive element in a form of a substantially flat elongated beam 30 is employed as the active element in the transducer. The beam has a uniform thickness which is substantially less than the distance between the side walls 14 and 16 of the slot 12 and a uniform width which is substantially less than the depth of the slot, so that with the beam disposed centrally in the slot it is protected and has ample room for movement in response to acceleration. The transverse cross-sectional outline of the beam 3 approximates that of the rectangular opening 22 in the support 10.

Figure 5:
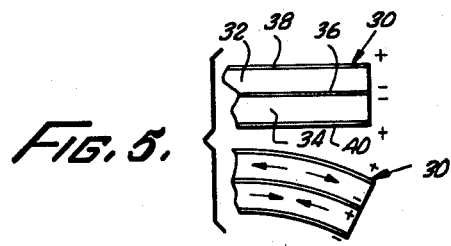
FIG. 5 is a fragmentary schematic drawing of the strain sensitive element of the transducer of FIG. 1 both in a normal and in a strained condition.
Figure 2:
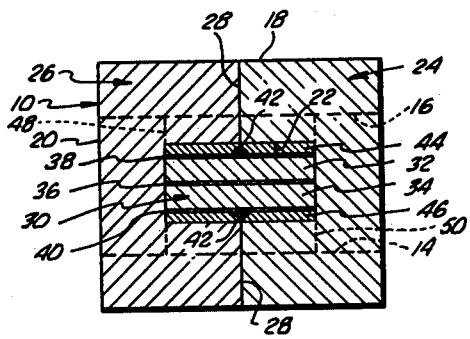
FIG. 2 is an enlarged sectional elevation taken along line 2—2 of FIG. 1.

As seen in FIG. 2, one form of the very thin (on the order of .02 inch) beam 30 comprises first and second layers 32 and 34 of piezoelectric material such as barium titanate which may be separated by a cental metallic layer 36 to increase its sensitivity. The use of several layers further increases the sensitivity but tends to increase the stiffness of the beam 30. Usually the central metallic layer 36 will be on the order of .006 inch in thickness. When the layer 36 is made of beryllium copper it constitutes the structural reinforcing of the beam, much like the steel placed within concrete beams. With many of the piezoelectric materials presently available, such a central layer 36 is requisite to provide a cantilevered construction which is strong enough to stand necessary handling. The barium titanate layers 32 and 34 which presently are available in thicknesses down to 0.1 inch each have a very thin (on the order of .001 inch metallic coatings 38 and 40, respectively, on the outer surface thereof, and are permanently polarized in opposite directions with respect to the central metallic layer 36 as indicated in FIG. 5. This gives the barium titanate material the desired piezoelectric properties in that a variation in the strain will produce a charge which is substantially proportional to the strain. As indicated by the arrows in FIG. 5, during bending in a downward direction, the top layer 32 of the beam 30 is in tension and the lower layer 34 is in compression. Since tensional and compressive strain will produce charges of opposite polarity and since the two layers are polarized in opposite directions, the generated charges on the layers due to the bending are additive.

A pair of wire leads 42 is soldered to opposite sides of the beam 30 adjacent one end thereof. Since the heat of soldering tends to damage the crystal, a very cool iron must be used. We have been successful with a 6 watt soldering iron employing Eisin Multicore solder containing 60 parts by weight tin and 40 parts by weight lead, available from Multicore Solder Ltd., Hemel Hempstead, Hertz, England. Alternatively, certain conductive cements may be used to secure the leads 42 to the beam 30. However, several transducers arranged in accordance with the present invention have been tested, and of those tested greatly increased sensitivity was obtained with the transducers which were soldered with the above defined method.

The beam 30 is disposed parallel to the side walls of the slot 12 and to the first exterior surface 18 of the support, and extends freely along the center of the slot for the larger portion of the length of the slot.

A substantial portion of the end of the beam, at which the wire leads are soldered together with the soldered ends of the wire leads themselves, is rigidly affixed in the rectangular opening 22 in the end of the support by means of two layers 44 and 46 of the same cement employed to bond the support half-sections together. The thickness of these cement layers, the wire leads and the solder are exaggerated in FIG. 2 for the purposes of illustration; actually, the beam fits snugly in the rectangular opening. The wire leads 42 extend outwardly past the end of the support to provide accessible electrical terminals.

This construction cantilevers the beam 30 to the support 10 in a manner which permanently immobilizes the electrical connections as well as that part of the beam which may have been damaged to some extent by the heat of soldering.

A concentrated damping action as well as additional support for the beam 30 is provided by first and second identical flat blocks of neoprene 48 and 50 disposed on opposite sides of the beam at a location about midway along the free portion of the beam. Each neoprene block engages substantially the full width of the beam, but only a small fractional part of the length of the beam. The blocks are compressed between the beam and the side walls of the slot in opposition to one another, and are cemented to the side walls of the slot to fix their position.

Figure 6:
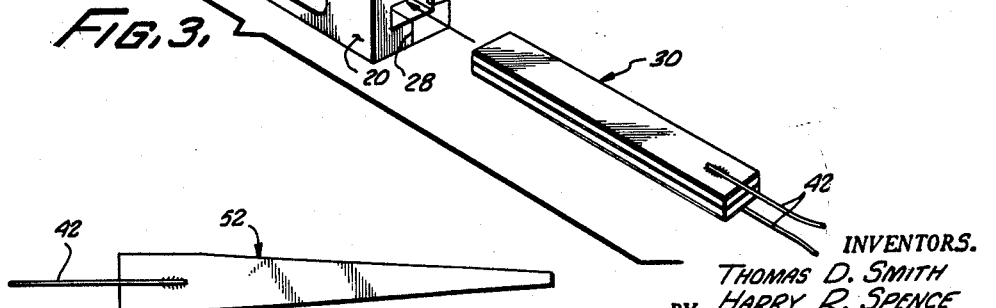
FIG. 6 is a plan view illustrating an alternate shape for a strain sensitive element.

Referring to FIG. 6, an alternative shape for a strain sensitive element is shown wherein a flat beam 52 is relatively wide at what would be its fixed end where the wire leads 42 are soldered, and tapers uniformly to a relatively narrow dimension at its free end. The object of this construction is to achieve greater sensitivity and a more uniform output response to a given acceleration. The tapered crystal achieves greater sensitivity because it provides for a more uniform bending along its length whereas the rectangular uniform crystal bends most near its fixed end and least near its free end. One present problem of the tapered construction is that such crystals are not presently commercially available in quantity; consequently, operating characteristics from crystal to crystal tend to be less uniform than in the case of the mass produced rectangular crystals. The tapering of the beam 52 may be extended to include the support region whereby the "rectangular" slot 22 is provided with a mating taper. Such construction facilitates desired assembly of the present apparatus by providing a keying or dovetail fit between the beam 52 and the support 10.

The rectangular outline of the transducer support is significant because the flat longitudinal surfaces thereby provided permit it to be mounted by cementing it directly to a test object. For example, depending upon the vibration direction to be measured, either the first longitudinal flat surface 18 which is parallel to the flat beam or the second longitudinal surface 20 which is perpendicular to the flat beam may be cemented to the object. The cement employed should have about the same rigidity as the housing. This type of mounting is very convenient and is lightweight. A typical cement which develops good bonding characteristics at room temperature in about a minute, and maximum characteristics in few hours, is Eastman 910 adhesive, available Eastman Chemical Products, Inc., Kingsport, Tennessee.

The free length of the beam 30 may be chosen as a function of its rigidity in accordance with the frequencies to which the device is to respond. The thinner (more flexible) the beam is made, consistent with necessary strength, the shorter it may be made to obtain a certain frequency response. Preferably the length is chosen so that the lowest mechanical resonance occurs at a frequency substantially greater than the highest frequency at which the crystal is expected to respond. Even so, if no elastic supporting blocks are employed, there is a great deal of variation (within a frequency band-pass range) of the crystal output with frequency, requiring the use of a calibration curve for each transducer where forces over a wide frequency range are to be measured. On the other hand, if the frequency of the applied force or a critical frequency of the test object is known, the location of and the characteristic of the (support) damping blocks and the beam configuration itself are arranged to tune the measuring device to this known frequency for obtaining a desired greatest sensitivity. It should be noted that several pairs of support blocks may be used to enhance vibrations at one particular harmonic of the beam.

Moreover, the transducer lends itself well to fluid damping which is easily provided by sealing the slot and filling it with a fluid such as silicone oil. This provides a reasonably constant output at the higher frequencies, say from 1000 to 2500 cycles per second for the Sonotone 2TS crystal in the transducer illustrated; however, fluid damping is found to provide more damping action than the use of relatively small blocks. Also, the sealing of the slot and the addition of the fluid add significant weight to the transducer, which for some applications may be objectionable.

One of the preferred damping arrangements is, as shown in FIG. 1, the employment of two small opposing elastic bodies. This arrangement is the lightest in weight and is the most versatile. Also, in some of the experimental models of the device, a substantially flat frequency response is maintained from about 30 to 2000 cycles per second. The blocks may be relocated toward the fixed end of the beam in order to increase the sensitivity of the device to a particular range of frequencies while sacrificing the flatness of the frequency response, and conversely may be moved toward the free end of the beam to flatten the frequency response of the device while sacrificing sensitivity. An intermediate position, preferably near the center of the free portion of the beam, is considered optimum for most situations. Although the barium titanate construction illustrated is very effective as an active element in the measuring device, there is a great deal of choice in the type of strain sensitive element that may be employed. For example, quartz crystals give an adequate output for some applications; Rochelle salt gives a high output, but care must be taken to place a Rochelle salt beam in an environment which will not damage it because of its relatively low melting point of about 55° C. Additionally, some of the newer materials appearing in the market place today have properties which will be very satisfactory in the piezoelectric beam 30. For instance, lead zirconate titanate has a high curie temperature such that the present invention, when utilizing this material, may be used in environments above 250° C.

The transducer can be made very small and light in weight. For example, one experimental model utilizing a beam 30 on the order of .02 inch thick has the size illustrated in FIG. 4, which may be compared to the size of an ordinary wooden kitchen match 54, also shown in that FIGURE. The model illustrated has an over all length of about 0.7 inch, transverse dimension of about 0.14 inch on each edge, and weighs about 0.35 gram. Operationally, this transducer has a sensitivity greater than 4 millivolts per gravity unit of force, and its output varies linearly (within 10% or less) with increased force at least up to 10 gravity units. The output remains constant within plus or minus 1.5 decibels over a frequency range of about 30 to 2000 cycles per second when the neoprene damping blocks are disposed at the central location. It is recognized that the support 10 functions primarily to contain and thus to protect the fragile beam 30 and secondly to support the damping or control support means. One of the advantages of the construction illustrated is the obtaining of a relatively rigid, lightweight throw-away item. However, the configuration of the support 10 may be modified without departing from the true spirit and scope of the invention as shown at 10a in FIG. 7.

Figure 7:
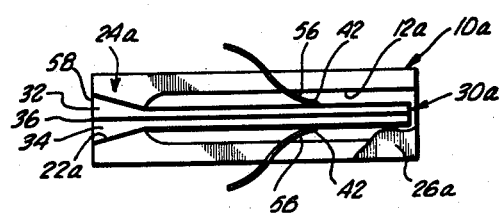
FIG. 7 is a plan view partially broken away, illustrating another embodiment of the present invention.

Moreover, the use of elastic support or damping blocks as illustrated in FIG. 1 may be modified substantially. The leads 56 connected to the terminals 42 may be arranged to provide desired damping of and support for the central portion of the beam 30a as shown in FIG. 7. Also, the beam 30a may be tapered at its support end 58 with the opening 22a having a similar taper to provide the above described keying arrangement. Because of economic expediency it is usually preferred that the tapered keying arrangement be in the plane parallel to the central metallic layer 36 rather than the form shown for illustrative purposes in FIG. 7. When the leads 56 are used as central support members, they may be fabricated from a material such as certain bronze alloys, providing a desired resiliency of support.

Figure 3:
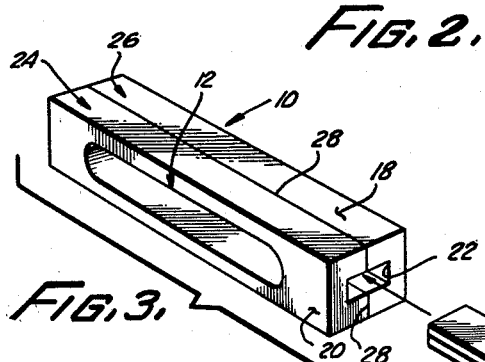
FIG. 3 is a perspective view of the support of the transducer of FIG. 1, with the strain sensitive beam aligned for insertion into the support.

In the embodiment illustrated in FIG. 7, the slot 12a does not extend entirely through the half section 24a whereby the half section 24a may be terminated without an end support portion as illustrated in FIGS. 1 and 3. However, it is usually preferable to have the half section 24a extend slightly beyond the end of the beam 30a to provide sufficient protection to prevent breakage of the fragile beam which might occur if the beam were to contact other objects.

When using the construction of FIG. 7, the assembly or fabrication of the device will be slightly different from that discussed in connection with FIG. 3 such that the beam 30a will be placed in the half section 24a and cemented prior to the application of the mating half section 26a (shown as substantially broken away). In this way the leads 56 may be properly positioned so that when the two half sections 24a and 26a are cemented together the lines will pass through the region of cement and will provide the desired central support of the beam 30a. Obviously, many other arrangements for supporting a central portion or portions of the beam 30 may be utilized without departing from the true spirit of the invention. Moreover, as the technology of materials develops suitable electrically conductive materials other than metals, the metallic coatings 38 and 40 may be replaced by such materials.

What is claimed is:

1. An accelerometer comprising a substantially rigid elongated support member, a flexible piezoelectric strain sensitive element located within said member, said element being secured at one end to said support member, said other end of said element being free of direct mechanical external forces thereby allowing said element to respond to inertial forces only, a pair of electrical terminals coupled to opposite sides of said element, and lead members connecting said terminals and contacting said element and said support member for resiliently supporting said element.

2. An accelerometer comprising a substantially rigid elongated support member having a longitudinal slot therein and an exterior flat surface parallel to the longitudinal direction of said slot, a flexible piezoelectric strain sensitive element in the form of a substantially flat elongated beam extending within the confines of said slot in parallel relationship with said flat exterior surface, said element being secured at one end to said support member, said other end of said element being free of direct mechanical external forces thereby allowing said element to respond to inertial forces only, a pair of electrical terminals coupled to opposite sides of said element, and lead members connecting said terminals and contacting said element and said support member for resiliently supporting said element.

References Cited in the file of this patent

UNITED STATES PATENTS

| 2,352,311 | Di Toro | June 27, 1944 |
| 2,484,950 | Jaffe | Oct. 18, 1949 |
| 2,722,614 | Fryklund | Nov. 1, 1955 |

FOREIGN PATENTS

| 763,226 | Great Britain | Dec. 12, 1956 |

OTHER REFERENCES

Electronics, October 1951, pp. 120–123.